United States Patent

Schneider

[15] 3,672,487

[45] June 27, 1972

[54] VERTICAL CONVEYORS

[72] Inventor: Erich Schneider, Wiesensteig, Germany

[73] Assignee: Organisation Ralfs KG, Wiesensteig, Germany

[22] Filed: March 6, 1970

[21] Appl. No.: 17,242

[30] Foreign Application Priority Data

July 29, 1969 Germany ...................... P 19 38 388.1

[52] U.S. Cl. .................................... 198/165, 271/9, 271/64
[51] Int. Cl. .................................................. B65g 15/4
[58] Field of Search .............................. 198/165; 271/9, 64

[56] References Cited

UNITED STATES PATENTS 1,858,416   5/1932   Rapley ............................... 198/165 X
2,593,242   4/1952   Bacon et al. ....................... 198/165 X Primary Examiner—Evon C. Blunk
Assistant Examiner—Hadd S. Lane
Attorney—Richard Low and Murray Schaffer

[57] ABSTRACT

A vertical conveyor having a pair of endless belts forming a run between which articles are conveyed. Infeed and discharge chutes are located along the run at a point where one of the belts is removed to interrupt and expose the run. Switch means are provided at the exposed portion to divert the containers to or from the run.

7 Claims, 4 Drawing Figures

INVENTOR.
ERICH SCHNEIDER

VERTICAL CONVEYORS

BACKGROUND OF THE PRESENT INVENTION

The present invention relates to a conveyor for vertically transporting articles and, in particular, to the mechanism for feeding articles to and for discharging articles from such devices.

In the copending application, Serial No. filed on even date herewith, based upon German application P 19 27 888.7, there is generally disclosed a vertical conveyor for transporting articles such as written material, files, books, etc. in containers between endlessly moving double belts. The conveyors are located within a wall or exterior shaft and carry the articles between the floors, or separate levels, of the building from an initial place to a predetermined destination. Both the intake feed station and the destination station are located outside of the conveyor shaft and must be provided with means for effecting the feeding and withdrawal of the articles.

Conventionally, the intake and discharge stations were separately constructed, requiring double installation, profusion of parts and a great amount of space within the wall or shaft. The mechanisms were therefore complex, uneconomical and burdensome.

It is an object of the present invention to provide a simple, economical and space saving means for feeding and discharging vertical conveyors.

It is an object of the present invention to provide a vertical conveyor having reliable and efficient discharge means for containers carried therein.

It is another object of the present invention to combine structurally the feed and discharge stations of vertical conveyors and provide means for alternating the use thereof.

SUMMARY OF THE PRESENT INVENTION

According to the present invention, one of the conveyor belts is interrupted to expose one of the up or down runs. A feed chute and a discharge chute having certain common structural features are located in association with the exposed run. A switch member such as a flap is mounted between the chute and the run and is selectively operable to close one or the other chute so as to have one or the other communicate with the run as desired.

In the preferred form, the operation of the switch is controlled by a signal derived from the passage of a container in the run. The container, as is known, carries indicia of destination capable of being sensed fully or semi-automatically. Various control and interlocking safety features are also provided.

A full disclosure of the present invention as well as an illustration of its objects and advantages follows herein.

BRIEF DESCRIPTION OF THE DRAWING

The following disclosure refers to the accompanying drawings in which.

DESCRIPTION OF INVENTION

Figure 1:
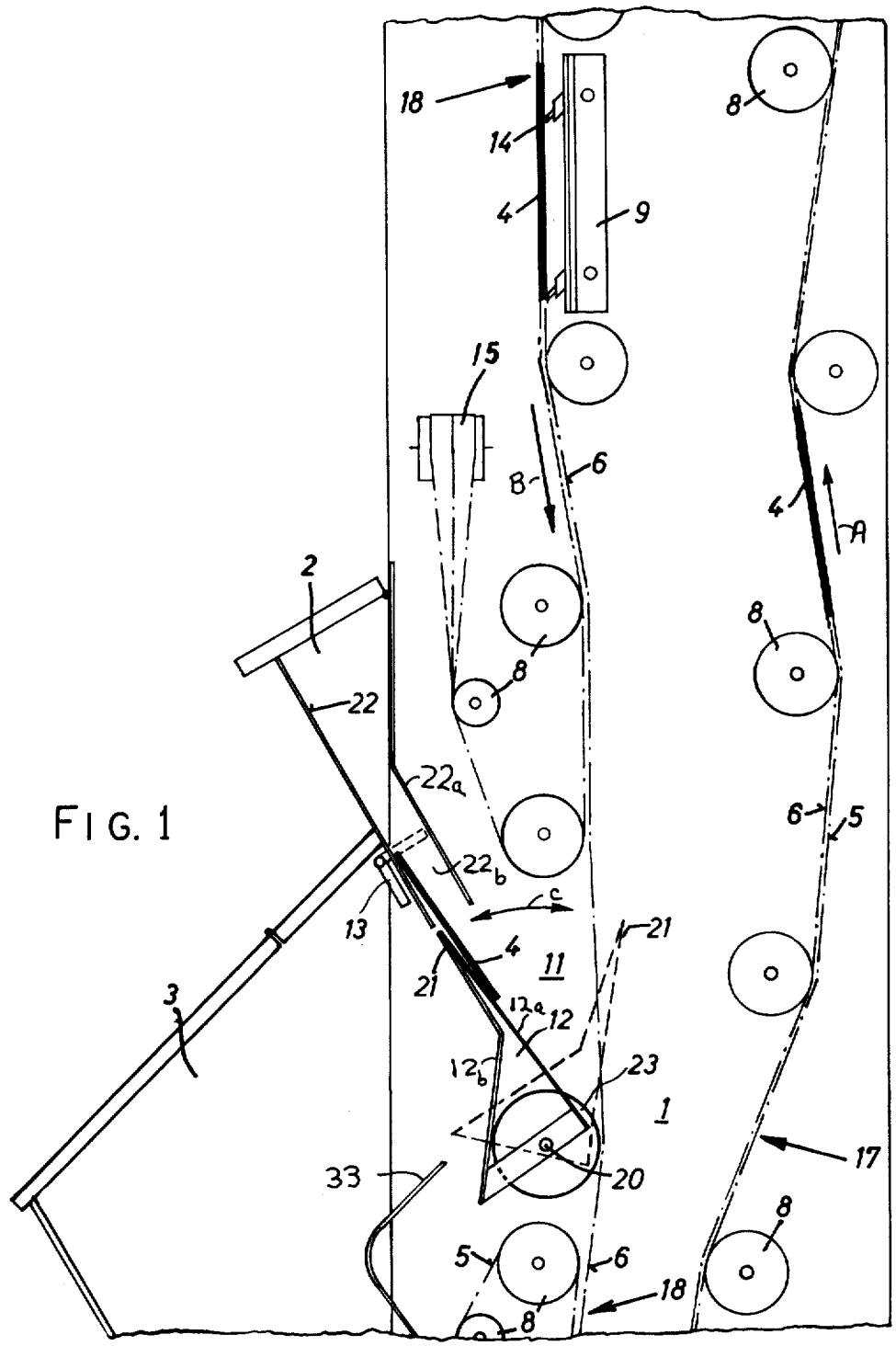
FIG. 1 is a schematic view of a portion of a vertical conveyor embodying the principles of the present invention.
Figure 2:
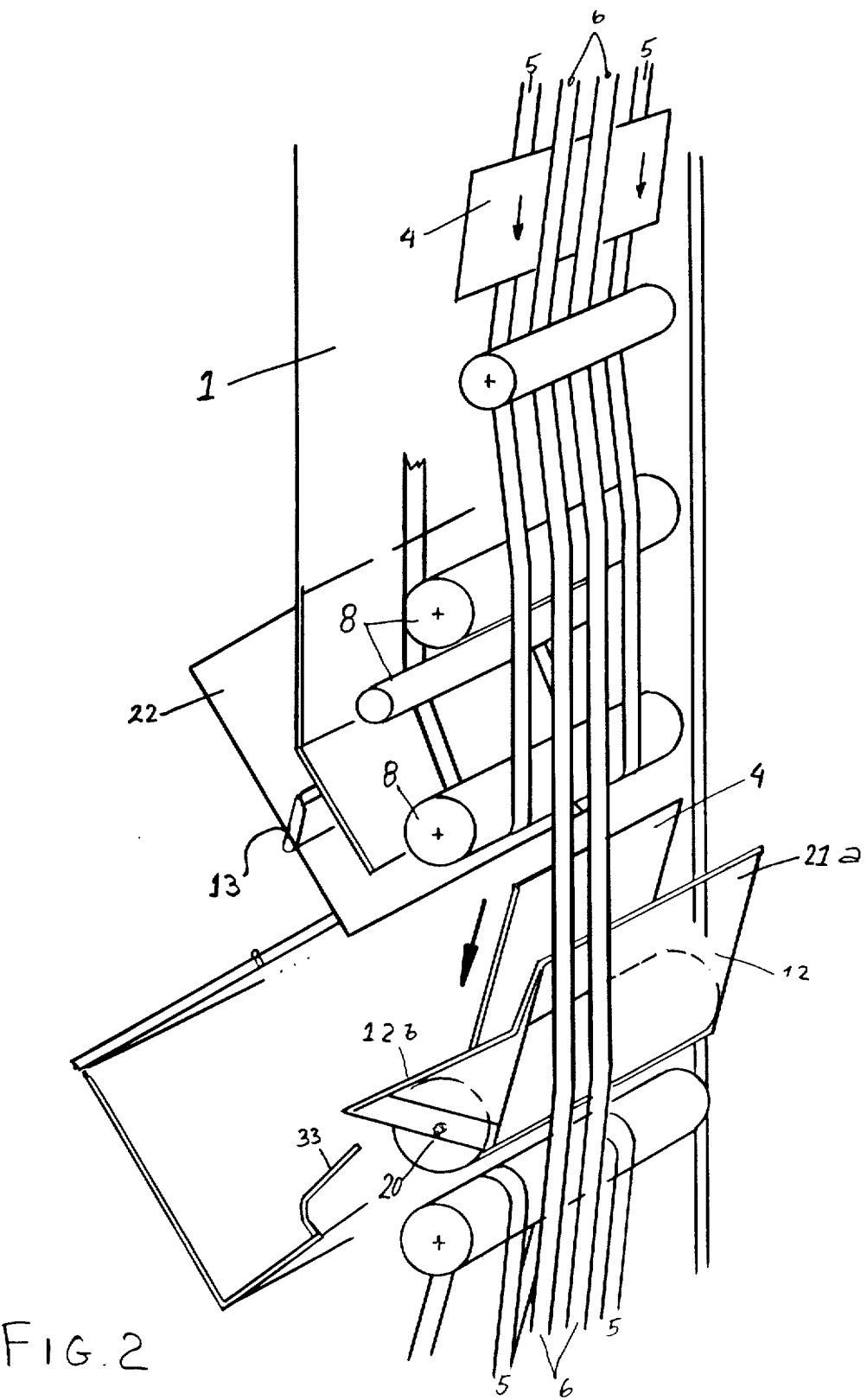
FIG. 2 is an enlarged perspective view showing the arrangement of conveyor belts and the discharge operation.
Figure 3:
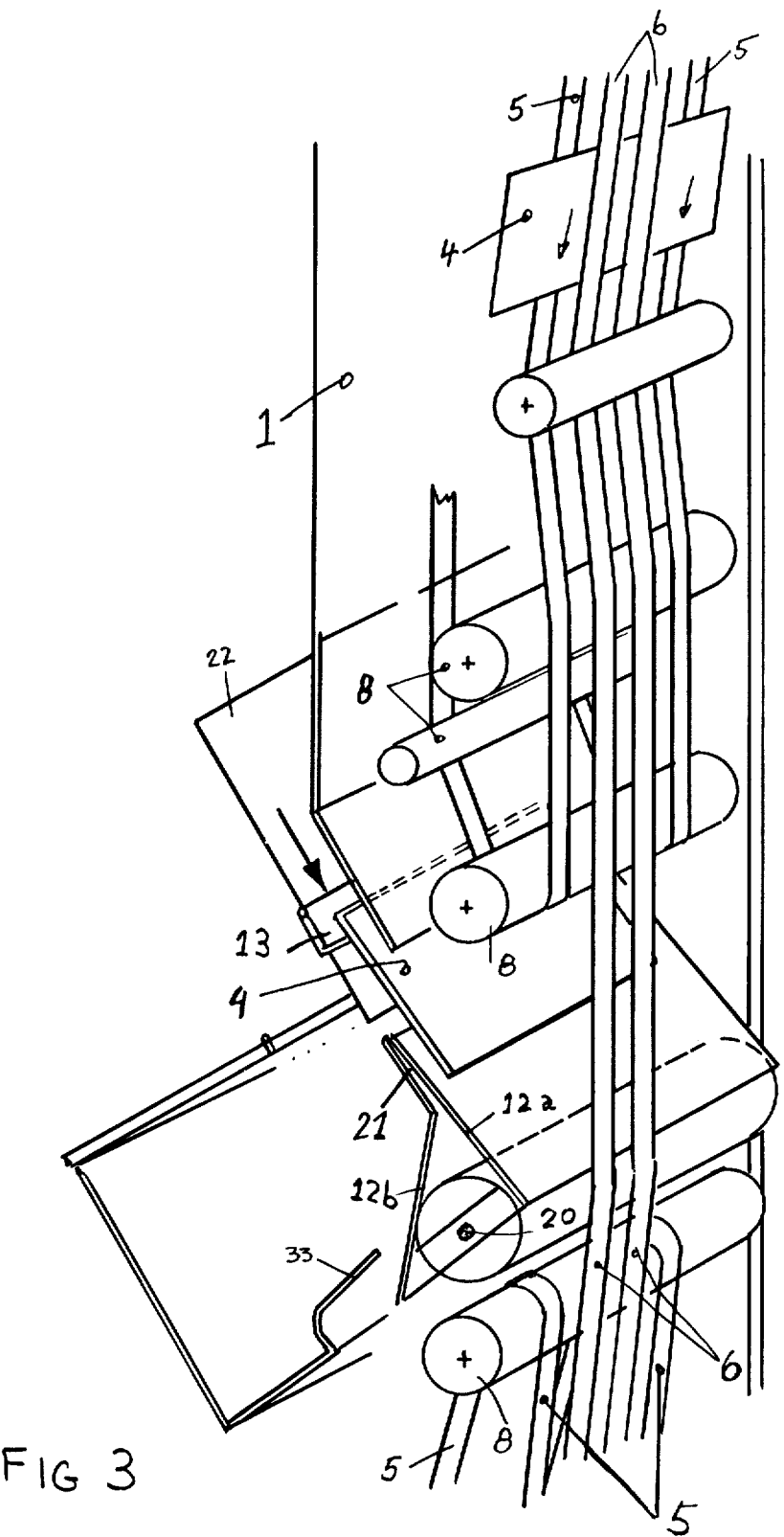
FIG. 3 is a view similar to that of FIG. 2 showing the feed operation.

As explained in the aforementioned copending application, the containers are inserted between the belts and carried therealong either upwardly or downwardly until they reach their proper level or destination where, in response to indicia carried by the container, they are automatically ejected and removed. The copending application is concerned with the disclosure of a switch mechanism for transferring containers between the up and down runs. The present invention is directed to the provision of an intake feed and discharge mechanism for supplying the conveyor initially with containers and for removing the containers from the conveyor. The feed and discharge units are preferably placed in predetermined locations, along the downward side of the conveyor so as to remove the containers as they move downwardly. It is, of course, possible to place them in the upward side.

Turning now to the present drawing, there is shown a portion of a vertical conveyor located within a vertical shaft, preferably mounted within the wall of a building although it might be mounted exteriorly thereof. Mounted on to the shaft 1 and communicating exteriorly of it are an intake chute 2 and a discharge chute 3 for manually or automatically feeding or removing article containers 4.

The conveyor itself comprises endless belt 5 straddling a centrally positioned endless belt 6 to form a double belt upward run 17 and a double belt downward run 18 as indicated by the arrows A and B. Belt 6, and belt 5, if so desired, is formed of a pair of similar bands arranged parallel to each other in side by side relationship in a common plane. The bands of belt 6 (and of belt 5 if so constructed) are spaced apart laterally to form a slot between them. It will be appreciated that since the Figure is an end elevational view, only one of the bands are seen. Preferably, the belt 5 comprises a single band which is positioned oppositely to the slot between the pair of bands forming the belt 6. The belts 5 and 6 are spaced relative to each other so that the containers 4 are securely held or clamped therebetween and are consequently carried along the respective runs as the belts are moved. The belts are provided with idler positioning rollers 8 and drive means, of a conventional nature to drive each of the belts synchronously.

For the sake of brevity, the disclosure of the copending application is incorporated herein, by reference, as if more fully set forth, rather than redundantly repeating it in detail.

In the form of conveyor shown here, the belt 5 comprises a single endless band which runs up along path A on the right of belt 6, turns over its upper end and then runs downwardly along path B on the left side of the central belt 6. At predetermined strategic position along the downward run 18 (conforming to an area 11 opposed to the infeed and discharge chutes 2 and 3), the belt 5 is withdrawn from its normal plane and passed through a conduit 15 which moves the belt 5 behind the infeed and discharge chutes 2 and 3 to a position where they can then be returned to the plane of the run 18 as shown in the lower left portion of the Figure. In this manner, the single band 5 can be withdrawn, interrupting the run 18, exposing the belt 6 to the infeed and discharge chutes while maintaining the belt 5 as an endless band.

The feed chute 2 and the discharge chute 3 are located one above the other. Each comprises a rectangular housing having a cover flap which is openable to insert or remove articles therefrom; the feed 2 has a lower wall 22 inclined downwardly from its cover in a direction toward the conveyor run 18. This wall 22 also forms the upper wall of the discharge 3. The chute 2 also has an upper wall 22a spaced from it and generally parallel to the lower wall 22 forming therewith a throat 22b. Both walls 22 and 22a terminate some distance from the path of the downward run 18 in the open area 11 within the shaft 1.

The discharge chute 3 is also formed rectangularly, and in addition to the wall 22, is provided with a back wall 33 which extends at an angle from the interior of the shaft 1 outwardly and downwardly. The wall 22 and wall 33 are spaced from each other to provide a passage from the shaft opening 11 into the discharge chute 3. The discharge passage is generally perpendicular to the feed throat 22b.

Located within the interruption on the run 18 and bridging the opening 11 between belt 6 and the feed and discharge chutes is a switch member 12 in the form of a shaped flap having a straight back 12a and an angular face 12b joined at their apex in a pointed tongue 21. The base 12c of the switch member 12 is mounted about a movable shaft 20 which is normally biased by spring means into the full line position shown. The shaft 20 is provided with a fixed pulley 23 connected by a conventional belt or other drive means to a solenoid or similar electro-mechanical motive means responsive to an electrical signal. The motive means is adapted to rotate the pulley 23 and consequently swing the switch member 12 in an arc shown by the arrow C, into the dotted line position.

Suitable stop means, or motive limiting means, are employed to define the arc C, so that the switch flap 12 moves between the first position with its back 12a in line with the wall 22 so as to extend the wall 22 from its terminus to a point adjacent the belt 6; and to the second position where the angular face 12b assumes the dotted-line position between the spaced bands of the belt 6 and the lower wall 33 of discharge chute 3. In the first position, the switch member forms within the opening 11 a slide through which a container may move from the throat 22b into entrainment in the run 18. In the second position, the switch member blocks the downward path of the run 18 forming a slide by which a container is ejected from the run into the discharge chute 3.

The feed chute 2 is also provided with a control gate 13 which is located in the throat 22b and adapted to pivot between a first position (shown in full lines) opening the throat and a second position (shown in dotted lines) closing the throat 22b.

The gate 13 is also biased by its own weight or by suitable spring means to be initially located and subsequently returned to the first position and is provided with a solenoid plunger or other mechanism, responsive to an electric signal, which will move it selectively into its second position.

Thus, the gate 13 can be made to act in combination with the movement of the switch member 12 to block the infeed on passage of a container downwardly along the run 18 or open the infeed on insertion of a container into the conveyor.

A sensing device 9, such as a micro-switch, magnetic head or other indicia sensing mechanism, is located along the run 18 before the interruption for the switch member 12. The sensor 9 is provided with a number of cooperating heads 14 designed to produce electrical signals which indicate the presence of a container in the run 18 and whether the container is destined for discharge at chute 3 or for a chute elsewhere further along the conveyor.

The sensor 9 or the actuating mechanisms of the switch member 12 and gate 13 include a timing device or timing circuit which limits the effect of the pulse obtained from passage of the container passed the sensor 9 for a time sufficient to permit the container to pass beyond the area 11.

It is conventional in conveyors of this type that the container be provided with a plurality of indicia indicating such things as sender, receiver and conveying path. Accordingly, the sensing device 9 is provided with multiple heads 14 adapted to read the plural indicia and to provide one or more signals for selective movement and activation of the conveyor components. It will be understood, however, that the sensing device 9 could be modified to conform it to any system of indicia employed.

Figure 4:
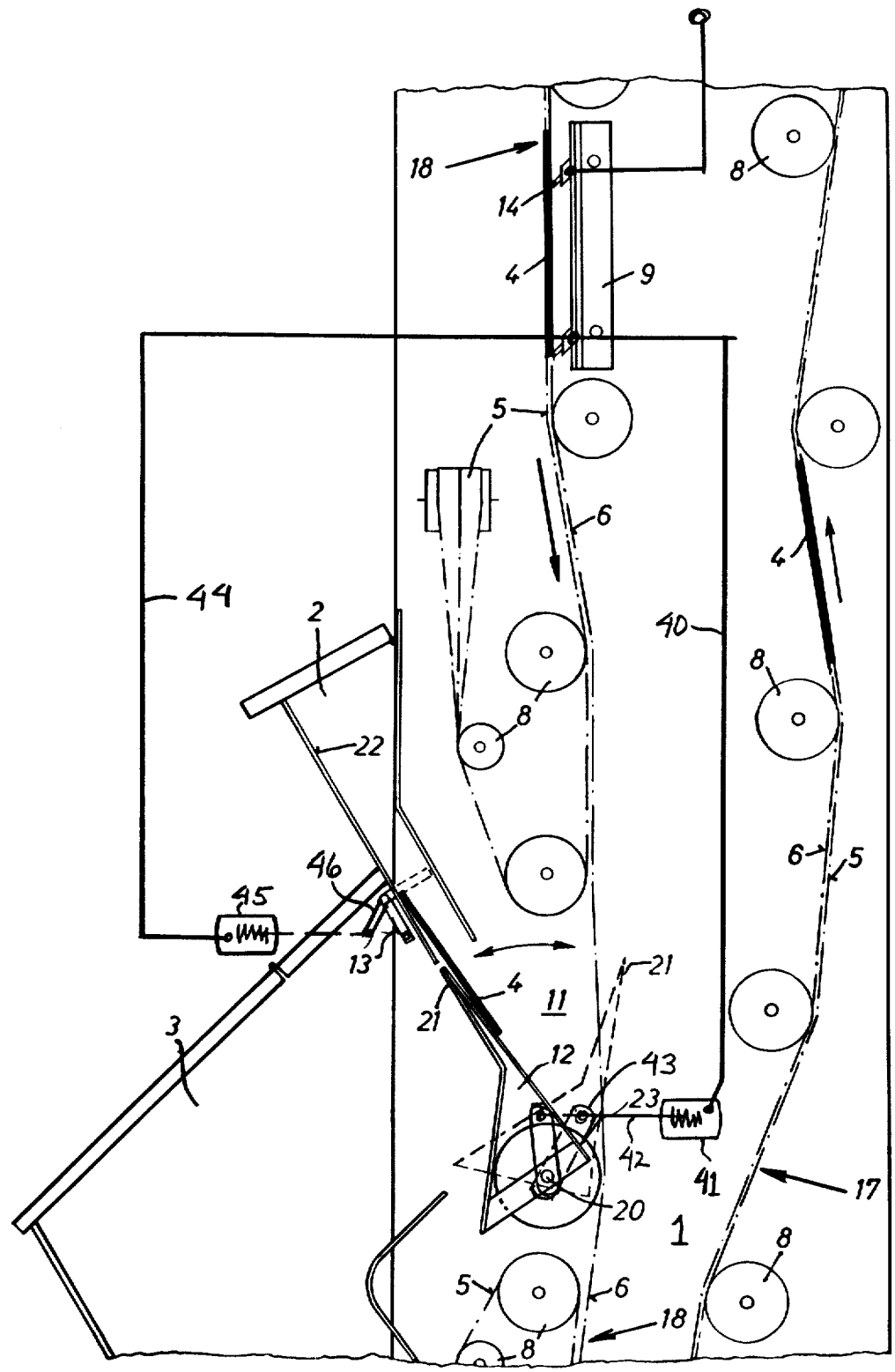
FIG. 4 is a view similar to FIG. 1 on which is superimposed a schematic diagram for operating the infeed and discharge gates.

As is seen in FIG. 4, the signal from the sensor 9 is transmitted via line 40 to a solenoid actuator 41, the rod 42 of which is linked to a lever arm 43 connected to the pulley 23 of the shaft 20. Similarly the output of the sensor 9 is transmitted by line 44 to another solenoid actuator 45 the rod of which is connected, also, to a lever 46 which is fixed to the pivot shaft of the gate 13. Thus the output of the sensor 9 which reads the presence and destination of the container 4 can be made to operate the gates. Thus, a signal produced by the output of the sensing device 9, determining the presence of a container 4 in the run 18, is transmitted to the solenoid actuator operating the control gate 13 in throat 22b which as a result is caused to pivot into its second position (dotted lines), thus blocking the infeed passage and permitting the downwardly moving container 4 to pass the area 11 without interference. This movement of the gate 13 occurs independently of whether the container is destined for discharge at chute 3 or is to pass beyond the area 11 to a further located discharge unit.

Should the sensing device 9 determine that the container 4 is to be discharged at the chute 3, it produces another signal which simultaneously operates the solenoid actuator rotating the pulley 23. The switch member 12 pivots to its second position (dotted lines) placing the tongue between the belt 6. The discharge chute 3 is opened and the container 4 is discharged. Simultaneously, the gate 13 continues to remain closed.

Should the container be destined for another discharge station, no signal is obtained to actuate the switch member 12. The switch member 12 remains in its first position (full lines) and the container passes through the area 11 into the lower part of the run 18. Meanwhile, the gate 13 continues to remain closed.

When the downwardly moving container has had sufficient time to pass the area 11, either being discharged or moving into the lower run, the signals received from the sensing device 9 are rendered inoperative by the timing mechanism and the gate 13 falls and the switch member returns to its respective first position (as shown in full lines).

In the normal or initial position of switch member 12 and gate 13 (full lines), a container may be freely inserted in the infeed. The sensing device 9 is placed sufficiently ahead of the area 11 so that advance warning and closing of the gate 13 can be effected in order to avoid collision of containers in the area 11.

Many modifications and changes will be apparent to those skilled in this art. For example, the device may be placed in the upward run of the conveyor by simply inverting and turning the arrangement around; the shape of the switch member may be varied, as well as the angular directions of the feed and discharge chute. The noted solenoid actuator may be replaced by hydraulic or pneumatic means and the sensing device by one or more mechanical or magnetic sensors. For this reason, the present disclosure is intended to be illustrative only of the present invention.

It will thus be seen that the present invention provides simple and effective means for feeding and discharging vertical belt conveyors. The mechanism is small and not complex. Many parts serving dual functions in both the feed and discharge portions. Because of the interlocking and cooperating control mechanism, reliable operation is obtained and collisions and jam-up are avoided.

What is claimed:

1. A conveyor for the vertical transport of articles comprising a pair of endless belts cooperating to form a moving run for said articles, one of said belts being interrupted along its length to expose said run, an infeed chute and discharge chute associated with said exposed run, a switch member mounted between said chutes and said exposed run said switch selectively moveable between a first position blocking said discharge chute and extending said infeed chute and a second position extending said discharge chute to said exposed run, and gate means for blocking said infeed chute at least when said switch member is in its second position, whereby said articles may be selectively fed to or removed from said run.

2. The conveyor according to claim 1, including a sensor located along said run prior to said exposed run for producing a signal indicative of the presence of an article in said conveyor and motive means for moving said gate means in to said blocking position in response to said signal.

3. The conveyor according to claim 2 wherein said gate means is normally biased out of blocking position and said motive means for actuating said gate means comprises a solenoid actuator.

4. The conveyor according to claim 2, wherein said sensor produces a signal indicative of the presence of an article to be removed at said discharge chute, and including motive means moving said switch member in response to said second signal from said first to second position to open said discharge chute.

5. The conveyor according to claim 4, wherein said infeed and discharge chutes are arranged one above the other and include common wall members having an opening leading to said exposed run, said switch member having a tongue extending therefrom bridging the distance between said exposed run and the chute openings and pivotable into cooperative association with each respectively.

6. The conveyor according to claim 5, wherein the tongue of said switch member has a planar outer surface conforming to the surface of the continuous belt at the exposed run portion, said switch means being movable into a third position wherein said surface cooperates with said belt to continue said run beyond the interrupted portion.

7. The conveyor according to claim 6, wherein said switch means is normally biased in its first position and the motive means for operating said switch member comprises a solenoid actuator.

* * * * *